United States Patent

Haas et al.

[15] 3,663,137
[45] May 16, 1972

[54] APPARATUS FOR MOLDING ARTICLES OF UNEVEN THICKNESS

[72] Inventors: Herbert G. Haas; Edmund Munk, both of Oberstenfeld; Alfred Fink, Uhingen; Erich Klink, Faurndau, all of Germany

[73] Assignee: Werzalit-Pressholzwerk J. F. Werz, Jr. KG (Oberstenfeld/Wurttemberg, Germany

[22] Filed: June 30, 1969

[21] Appl. No.: 837,649

Related U.S. Application Data

[63] Continuation-in-part of Ser. No. 698,050, Jan. 15, 1968, abandoned, which is a continuation of Ser. No. 437,107, Mar. 4, 1965, abandoned.

[30] Foreign Application Priority Data

Mar. 7, 1971  Germany......................P 14 53 386.9

[52] U.S. Cl..............................425/148, 425/259, 425/363, 425/172, 425/449, 425/215
[51] Int. Cl.............................................................B29c 5/00
[58] Field of Search ......................18/5 L, 4 B, 4 R, 4 S, 1 A, 18/26 R, 2 EM; 264/109, 112; 156/360, 62, 62.2

[56] References Cited

UNITED STATES PATENTS 2,737,997  3/1956  Himmelheber et al...............18/4 B X
2,822,024  2/1958  Himmelheber et al.,............264/109 X Primary Examiner—Theron E. Condon
Assistant Examiner—Horace M. Culver
Attorney—Patrick D. Coogan, John M. Crawford and Leslie G. Noller

[57]  ABSTRACT

A method of and apparatus for preforming moldable compositions of fibrous materials and a binder in which the preform had portions along its width having different thicknesses corresponding to different thicknesses of the final molded product. Initially the composition is formed into a mat which has a thickness at least equal to the thickest portion of the preform, and then excess material is removed from across the width of the mat by scalping rolls to develop the contoured preform having different thicknesses. Each section of the mat having a different thickness is weighed separately to insure proper density of that section of the mat. Following the weighing step, the mat is again shaped into the contoured preform and placed into a mold for a subsequent heating and pressing operation.

7 Claims, 3 Drawing Figures

INVENTORS
HERBERT G. HAAS
EDMUND MUNK
ALFRED FINK
ERICH KLINK

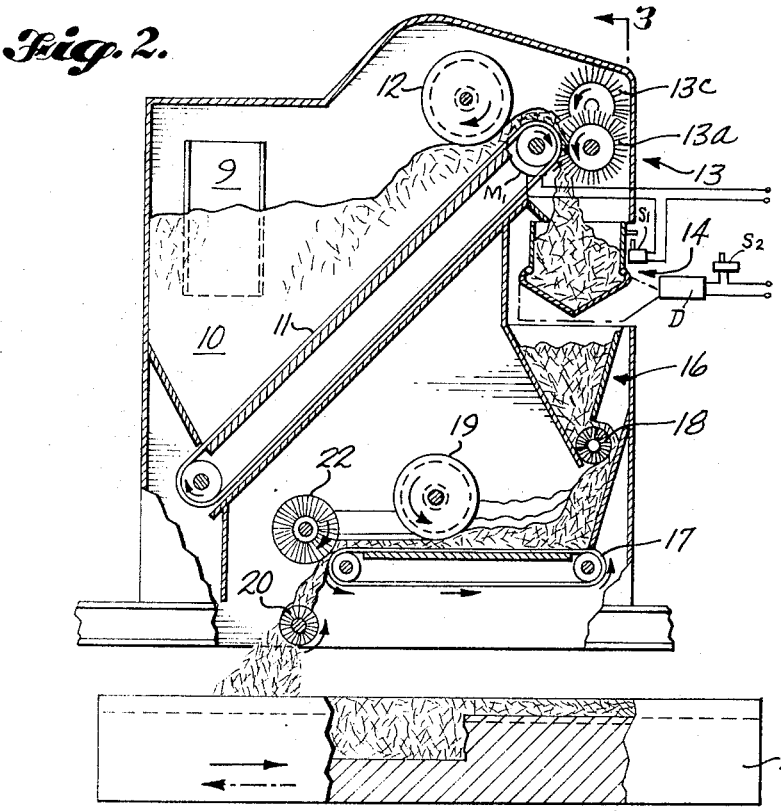
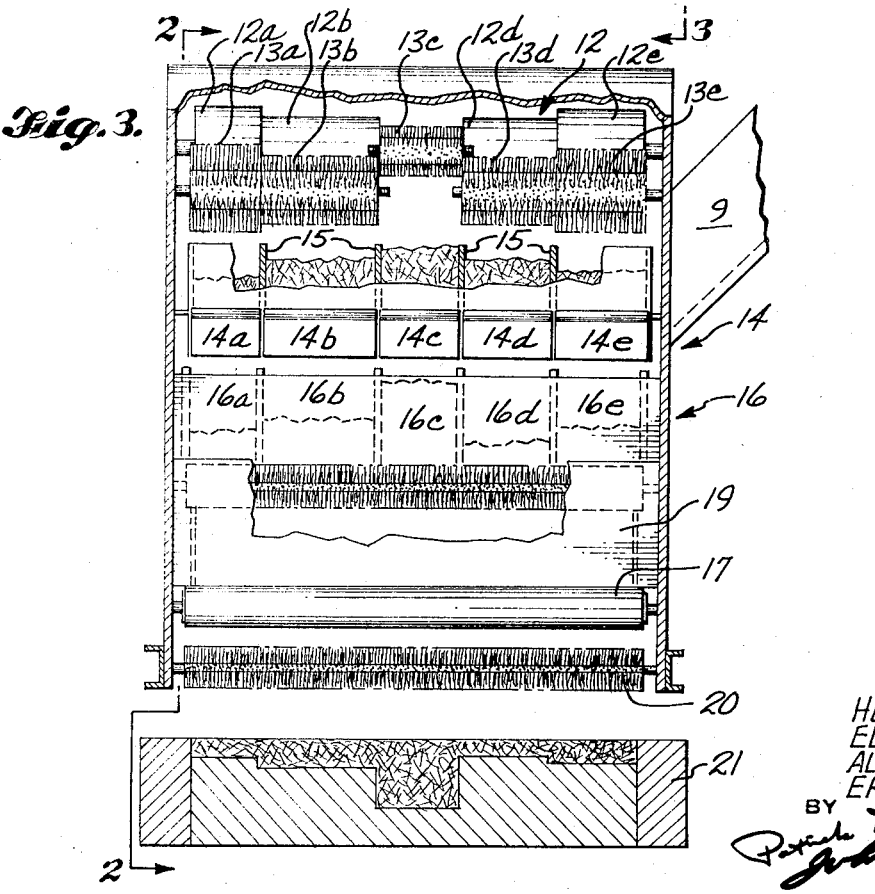

APPARATUS FOR MOLDING ARTICLES OF UNEVEN THICKNESS

CROSS-REFERENCES TO RELATED APPLICATIONS

This application is a continuation in part of application Ser. No. 698,050 filed Jan. 15, 1968, and now abandoned. That application was a continuation of application Ser. No. 437,107 filed Mar. 4, 1965, and now abandoned. The latter application claimed priority from an application file No. F422451c/39a[7] filed Mar 7, 1964, in the Federal Republic of Germany.

BACKGROUND OF THE INVENTION

1. Field of the Invention

Field of this invention is the method of and apparatus for molding a contoured article having different thicknesses across a cross-section through the article. The article is made by compression of a mixture of comminuted fibrous materials with suitable binders. The method and apparatus specifically are for forming a preform prior to compression.

2. Description of the Prior Art

There are various methods and apparatus known in the prior art for automatically preforming these materials prior to their compression so as to form flat layers for the purpose of producing flat molded articles of substantially uniform thicknesses, such as fiber board, chip board, or the like. These materials are first mixed and then spread onto a plate to form a layer of the required thickness. The thickness will depend upon the rate of the subsequent compression and the thickness of the panel to be produced. The density of the loose material is as uniform as possible within the entire layer. For attaining the best possible products, it has also been found that it is advisable to weigh the loose material very accurately so that the weight of each batch conforms exactly to the weight of the final molded product, taking, of course, into consideration the reduction in weight caused by the evaporation of moisture during the actual molding operation which is usually carried out under heat and pressure. In this manner it is possible to attain panels of a substantially uniform density and a uniform specific gravity.

While these methods and apparatus may be employed very successfully for automatically producing flat molded panels, boards, and the like of a high quality, they can, of course, not be used for producing molded articles of irregular cross-sectional dimensions, especially if these articles are also required to have an all-over uniform density and a uniform specific gravity of predetermined values, or different densities and different specific gravities of predetermined values at different parts thereof.

It has therefore in the past been necessary to carry out at least some of the steps preceding the actual molding operation of articles or irregular cross-sectional dimensions by manual labor. It requires no more than common sense to understand that, apart from the fact that this involves very tedious work and increases the cost of production considerably, it is practically impossible to attain such molded products either with an exactly uniform density and specific gravity or even with different particular values of density and specific gravity at different parts thereof. Although by mere chance or careful trial it might be possible to attain one or even a few molded articles of such irregular cross-sectional dimensions which might comply fully with all requirements, a mass production — and especially one on an economic scale — would be impossible. One of the results of such uncontrolled density values is that, if such molded products are to be subjected to special surface treatments, for example, by veneering them or coating them with resin-impregnated paper, an excessively high number may be deficient in appearance or become subsequently deficient, for example, by the absorption of moisture, and may either have to be scrapped immediately or cause serious complaints of customers when the defects become evident subsequently.

SUMMARY OF THE INVENTION

The present invention is directed to a method of and an apparatus for forming a preform of comminuted fibrous material and binder for a final product in which the cross-section of the product has varying thicknesses and the entire product has a required density so that there will be no soft spots or holes in the molded material.

One feature of the invention is the provision of a number of preforming rolls which may have varying diameters and varying spacial relationships with the conveyor carrying the moldable material so that the preforming rolls will have an outer contour along their actual direction substantially in proportion to the irregular surface of the final molded product. The rotating rolls shape or form the surface of the loose fibrous material to the shape of the surface of the final article by milling off excess parts of the material.

The separate preforming rolls are all driven at the same peripheral speed regardless of their diameter. This requires that each of the rolls be driven independently of the others. The separate axles of the rolls may be tilted so that the entire roll is at an angle to the conveyor passing beneath it.

The material is carried to the preforming rolls by the conveyor formed of one or more belts. If a plurality of belts are used, each belt will have a separate drive.

Another feature of the invention consists in employing a secured set of preforming roll or rolls subsequent to the original shaping rolls for the additional purpose of compacting the layer or layers sufficiently so that the preform may then be fed directly into a press to be molded to its final size or to form an intermediate product which is later again compressed, preferably in a heated mold, to its final size and shape. This is especially useful if the article is of simple shape and the different parts have relatively small differences in height.

Another feature of the invention consists in the provision of suitable means, for example, a discharge brush roll or rolls for removing the loose preformed material from the conveyor belt and feeding it into the mold.

A further important feature of the invention consists in the provision of suitable means for propelling the loose preformed material into the mold so as to pack the material therein at a uniform density despite the difference in height of different parts of the mold or, if required, at different densities at different parts of the mold. These means may be either of a pneumatic type or a mechanical type, for example, a propelling roll or several such rolls of different diameters and of a shape similar to that of the preforming roll or rolls. These will fill the mold so that all parts thereof, despite their different height, will be completely filled simultaneously and at the desired density or densities of the material.

A considerable advantage of these propelling means is also attained by the fact that by the impact of the fibrous materials in the mold, the fibers orient themselves so as to lie in substantially the same direction and therefore the solidity of the final product as well as its resistance to subsequent deformation due to moisture are considerably increased. Without such acceleration the fibers would extend in various directions and the solidity of the molded products would be very unreliable. A further advantage of these propelling means is that they eliminated the danger that the fibrous materials, when being filled into the mold merely by gravity and entirely unoriented so as to extend in various directions, might form bridges and thereby cavities underneath these bridges or at least parts in which the material does not possess the same density as in other parts so that the different parts of the final molded article will also not possess either a uniform density and solidity, or the required specific gravity.

Another very important feature of the invention consists in weighing the loose fibrous material, preferably after it has first been treated by one or more preforming rollers in the manner as above described, so that the different parts of the material, after their proper volume has been determined so as to be in the proper proportion to the different parts of the mold, will also have the required specific gravity or gravities in proportion to the specific gravity or different specific gravities of the different parts of the molded product.

A feature of the apparatus according to the invention therefore consists in providing suitable multiple scales, that is, a scale which consists of a plurality of individual scales side-by-side which are adapted to weigh the different amounts of the loose material independently of each other as required for the shallower and deeper parts of the mold. The number of individual scales depends upon the cross-sectional shape of the molded product and the accuracy of the specific gravity or gravities as may be required in the final product. This division of the scale into a plurality of scales may be necessary especially because of the differences in the specific gravity of different parts of the loose fibrous material which may come from different sources. For example, in the production of chip board, the wood chips may come from different types of wood of different specific gravities or, even if they come from only one type of wood and even from the same tree, some parts thereof will be heavier than others. Thus, even if the loose material is preformed so as to have the proper volume and density, it may vary considerably in specific gravity which may seriously affect the properties of the final product. These scales may also take into account the loss of weight of the material due to the evaporation of moisture in the actual molding of the final product and even the different losses of weight of the different parts of the final product due to their differences in height.

Another advantage which is attained by the invention consists in the fact that, due to the preforming operation of the loose material and the new method of filling the molds, the latter may be of a smaller and more simple construction than was previously required when the filling operation was carried out manually.

Still another advantageous feature of the invention consists in the provision of suitable means for adjusting the preforming rolls as well as other parts of the apparatus, if necessary, so as to vary to height of the entire preformed layer of fibrous materials as well as the height of different parts thereof so as to attain molded products of different thicknesses, different specific densities, and different shapes.

In the event that the article to be molded in the direction transverse to the feeding movement of the loose material, but should vary at least to some extent in the longitudinal or feeding direction, a single scale may suffice and several weighing operations may be carried out intermittently on the successive parts of the layer of loose fibrous material. The required difference in height of the layer in its longitudinal direction may also be attained either in place of or in addition to such successive weighing operations by varying the distance of the axis of the preforming roller or rollers from the associated conveyor belt. This effect may be further controlled or increased by also varying the speed of the conveyor belt or belts upon which the loose material is deposited. Of course, if the article to be molded varies in height in both directions and the fibrous material is also to be weighed by a multiple scale in the manner as previously described, the height of the layer on the receiving belt or belts on which the material is deposited after being weighed may also be varied in the longitudinal direction either by driving this belt or these belts at different speeds or by varying the height of the axis of the equalizing roller or rollers from this belt or by combining these two features with each other.

In any event when a single scale or a plurality of scales side-by-side are employed in the method according to the invention, each of these scales is provided with means for interrupting the further feeding movement of loose material by the feeding belt or belts to the scale or scales when the required weight is reached. These means are preferably designed so as first to slow down the feeding movement of the belt or belts when the scale or scales are nearly filled before stopping the feeding movement entirely when the scale or scales indicate the full desired weight.

Especially in such cases in which the height of the preformed layer of loose material should vary very considerably in the transverse direction, it may be desirable in order to facilitate the operation of the preforming rollers or to reduce the number of successive preforming rollers to provide additional stationary baffle means and/or suction means for reducing the height of certain parts of the layer.

BRIEF DESCRIPTION OF THE DRAWINGS

FIG. 2 is a diagramatic cross-section from the side showing the apparatus in FIG. 1.

FIG. 3 is a diagramatic cross-section from the front showing the apparatus of FIG. 1.

DESCRIPTION OF THE PREFERRED EMBODIMENT

Figure 1:
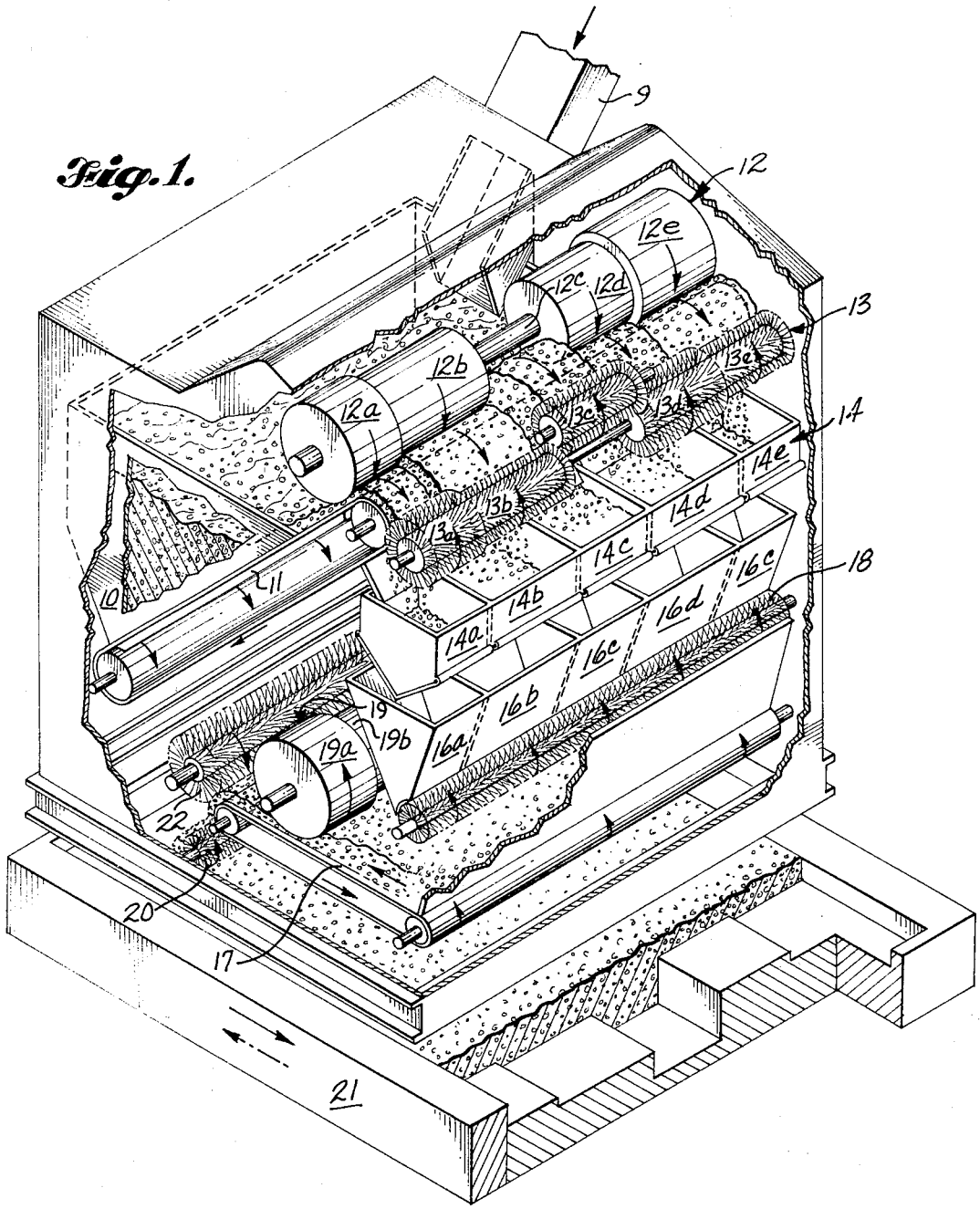
FIG. 1 is an isometric view with portions cut away to show the internal details of the apparatus.

The apparatus comprises a loading bin 10 which is filled through chute 9 with a batch of finely shredded fibrous materials, for example, wood chips, which are mixed in the proper proportions with a thermosetting binder. This loading bin 10 is defined at one side by an inclined conveyor belt 11 or a plurality of such belts side-by-side. If a plurality of belts is used, each is driven by a separate motor or speed reduction mechanism so that the speed of each belt may be varied from the speed of the other belts to convey different amounts of materials simultaneously to a rotating preforming roll 12 which is adopted to form the upper surface of the layer of loose material in proportion to the difference in height of the different parts of the article to be molded. The preforming roll 12 is formed by a number of preforming rolls 12a, 12b, 12c, 12d and 12e having a common axis but different lengths and diameters in order that the outer contour of the preform roll will shape the mat into a preform of the desired contour. If necessary each of the individual rolls 12 may be on different axis and driven separately so that the entire preform roll will have the same peripheral speed. It is also possible to use rolls 12 of the same diameter but which are spaced at different distances from the conveyor belt 11 in order to provide a proper contour to the mat. If necessary, the axle of the roll 12 or each of the rolls 12a – 12e may be tilted from the horizontal. The individual preforming rolls 12 may be adjustable to different lengths or be exchangeable for others when different mat contours are required.

The material milled from the upper side of the layer on the belt 11 by the preforming roll or rolls 12 is thrown back by the roll into the loading bin 10.

After passing from the preforming roll or rolls 12, the loose but formed material is removed from the upper end of the conveyor belt 11, for example, by means of one or more brush rolls 13, shown as having a contour similar to the contour of preforming rolls 12, and passed into a multiple scale 14. The scale 14 has a plurality of laterally adjacent scales 14a, 14b, 14d and 14e which are adopted to weigh the different parts of the fibrous material. These different parts have been measured volumetrically by the preforming roll or rolls 12. The number of the scales 14 depends upon the shape of the final molded article and the desired degree of accuracy of its weight distribution across the direction transverse to the feeding direction. When the weight of the material in an individual scale approaches the desired weight, for example, the weight of that part in the final molded article minus the weight of the moisture which will be expelled or evaporated during the actual molding operation or operations, the scale actuates suitable switch means $S_1$ connected in circuit with the drive motor $M_1$ of the conveyor belt 11, for reducing the speed of the conveyor belt 11 until the scale indicates the accurate desired weight. The scale again actuates the switch means so as to stop the movement of the belt 11 and preferably also the preforming roll 12 and the brush roll 13 which may be driven through appropriate transmission means from the motor $M_1$ so that no further material will be added to the scales. If an individual belt section 11a–11e, preform roll 12a–12e and brush roll 13a–13 is used for an individual scale 14a–14e then each individual scale will stop its individual belt, preform roll and brush roll. If a single drive is used for the belts and rolls, then the first scale to reach desired weight will stop the system and the other scales must be filled by hand to desired weight. The material in each scale is kept separate from the material falling into the adjacent scales by the plates 15 extending between the brush rolls 13 and the scales 14.

After each of the scales reaches desired weight, a suitable switch $S_2$ connected in circuit with operating means O cooperating with the bottom of each scale will open the bottom of each scale 14, dropping weighed material through a chute or plurality of adjacent chutes 16 onto one or a plurality of adjacent discharge conveyor belts 17. Within the lower, narrower end opening of the chute or chutes 16 one or more distributors 18 may be mounted for properly distributing the material on the discharge belt 17 and for preventing it from being packed thereon by the impact. The distributors 18 may take the form of brush rolls.

Above the discharge conveyor belt or belts 17 another preforming roll 19 or plurality of such rolls side-by-side are mounted which carry out the same function as the preforming roll or rolls 12 and are contoured and driven in the same manner. These rolls mill off the excess parts of the material on the belt or belts 17 so that the layer thereafter has again the proper shape and density in proportion to the molded product. At the end of the discharge belt or belts 17, suitable means, for example, a properly shaped discharge brush roll 22 or a plurality of such brush rolls side-by-side are provided for removing the preformed layer from the belt or belts 17 and propelling them downwardly toward the mold 21. The mold 21 is moved longitudinally as shown by the arrows, underneath the apparatus until filled and then either cold pressed to compress the material into an intermediate product or directly hot pressed to compress and thermoset the material to form the final product.

The propelling action of the discharge brush roll or rolls 22 or of additional propelling means 20 subsequent thereto is of importance for the purpose of filling the deeper parts of the mold 21 as quickly as and at the same density as the material which is filled into the shallower parts. It is, however, of still greater importance that by being thus accelerated, the fibrous materials, for example, wood chips, will be oriented by their impact in the different parts of the mold so that all of them will thereby be deposited in the mold in a substantially horizontal position. These additional propelling means may be of a pneumatic or mechanical type. In FIGS. 1–3 they are illustrated in the form of a special propelling roll or rolls 20 intermediate the discharge roll or rolls 22 and the mold 21.

For adjusting the apparatus to different kinds of molds, the various rolls 12, 13, 19 and 22 should be adjustable to different distances from the respective conveyor belts, and the axis of the different rolls should also be adjustable to different angles to the horizontal so that one side of each roll may be adjusted so as to be spaced a greater distance from the respective conveyor belt than its other side. Furthermore, the apparatus may also be designed so as to produce molded articles with different heights in the longitudinal direction. For this purpose suitable adjustable control means may be provided for automatically changing the distance between the last preforming rolls, the discharge rolls, and the associated conveyor belt. For the same purpose, it is also advisable to provide suitable means for varying the speed of the conveyor belts.

Although our invention has been illustrated and described with reference to the preferred embodiments thereof, we wish to have it understood that it is in no way limited to the details of such embodiments but is capable of numerous modifications within the scope of the impending claims.

Having thus fully disclosed our invention what we claim is:

1. An apparatus for automatically preforming a mixture of comminuted material and a binder to produce a moldable blank of substantially uniform density and having in transverse direction of the blank portions of different thickness, said apparatus comprising a plurality of scale means, one for each of said portions of different thickness of said blank, said plurality of scale means being arranged side-by-side in said transverse direction; means for feeding into each of said scale means part of said mixture; means for stopping further feeding when the respective scale means has received a part of said mixture which has a weight substantially in proportion to the corresponding transverse portion of the desired blank to be produced; means cooperating with said scale means for discharging the weighed parts therefrom; conveyor means positioned below said scale means for receiving said weighed parts therefrom in said transverse direction so as to form a layer therefrom and for feeding said layer in a direction substantially normal to said transverse direction; forming means cooperating with said conveyor means and the layer formed thereon for shaping the upper surface of said layer to form in said layer transverse portions of substantially uniform density and each having a thickness in proportion to the different thickness of the transverse blank portions to be produced; and means for removing said layer from said conveyor means and for feeding said transverse portions of said layer in the same transverse arrangement into a mold having a mold cavity whose depth varies in said transverse direction in accordance with the desired different thickness of the blank portions to be produced so as to fill said mold to a substantially uniform level.

2. The apparatus as defined in claim 1, wherein said forming means comprise a plurality of rotatable rolls, one for each portion of said layer, each of said rolls having a peripheral surface arranged with respect to the upper surface of said conveyor means so that the generatrix which, during rotation of the respective roll is closest to said surface, is spaced therefrom a distance substantially equal to the thickness of the respective layer portion.

3. The apparatus as defined in claim 2, wherein said plurality of rolls are rotatable about a common axis, and wherein said rolls have different diameters.

4. The apparatus as defined in claim 1, and including rotary means for propelling said transverse portions of said layer after being removed from said conveyor means at an increased velocity higher than the speed of said conveyor means into said mold while the latter moves horizontally and in a direction substantially normal to said transverse direction.

5. The apparatus as defined in claim 1, wherein said means for feeding parts of said mixture into said scale means comprise additional conveyor means having a discharge end located above said scale means; means for depositing said mixture on said additional conveyor means to form a layer of said mixture thereon; and preforming means upstream of said discharge end for shaping the upper surface of the mixture layer on said additional conveyor means to form in said layer transverse portions of substantially uniform density and each having a thickness in proportion to different thickness of the transverse blank portions to be produced.

6. The apparatus as defined in claim 5, wherein said preforming means comprise rotatable preforming roll means having an outer contour in said transverse direction and being arranged with respect to said additional conveyor means in such a manner so as to form in said layer on said additional conveyor means said transverse layer portions.

7. The apparatus as defined in claim 6, and including drive means cooperating with said additional conveyor means and said preforming roll means for rotating the latter in a direction opposite to the movement of said conveyor means.

* * * * *